United States Patent
Borkar et al.

(10) Patent No.: US 9,779,158 B2
(45) Date of Patent: *Oct. 3, 2017

(54) METHOD, APPARATUS, AND COMPUTER-READABLE MEDIUM FOR OPTIMIZED DATA SUBSETTING

(71) Applicant: Informatica LLC, Redwood City, CA (US)

(72) Inventors: Vinayak Borkar, San Jose, CA (US); Richard Grondin, Ste-Julie (CA); Ankur Gupta, Ghaziabad (IN); Bhupendra Chopra, Hyderabad (IN)

(73) Assignee: Informatica LLC, Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/982,916

(22) Filed: Dec. 29, 2015

(65) Prior Publication Data

US 2016/0110444 A1   Apr. 21, 2016

Related U.S. Application Data

(63) Continuation of application No. 13/714,349, filed on Dec. 13, 2012, now Pat. No. 9,262,501.

(51) Int. Cl.
*G06F 17/30* (2006.01)

(52) U.S. Cl.
CPC .. *G06F 17/30604* (2013.01); *G06F 17/30339* (2013.01); *G06F 17/30587* (2013.01); *G06F 17/30864* (2013.01); *G06F 17/30958* (2013.01)

(58) Field of Classification Search
CPC ......... G06F 17/30864; G06F 17/30604; G06F 17/30958; G06F 17/30587; G06F 17/30339
USPC .................................................. 707/736, 770
See application file for complete search history.

(56) References Cited

U.S. PATENT DOCUMENTS

2006/0101071 A1* 5/2006 Henderson ................. 707/104.1
2012/0023141 A1* 1/2012 Holster ........................ 707/798

OTHER PUBLICATIONS

Nandish Jayaram et al., Querying Knowledge Graphs by Example Entity Tuples, 2015, vol. 27, 27-97-2811.*

* cited by examiner

*Primary Examiner* — Jean B Fleurantin
(74) *Attorney, Agent, or Firm* — Amardeep S. Grewal; Reed Smith LLP

(57) ABSTRACT

An apparatus, computer-readable medium, and computer-implemented method for data subsetting, including receiving a request for a subset of data from a plurality of tables, generating an entity graph corresponding to the plurality of tables, expanding the entity graph if the entity graph does not have any cycles, and performing acyclic subset processing on the expanded entity graph if the entity graph does not have any cycles and the expanded entity graph does not have any cycles.

18 Claims, 16 Drawing Sheets

METHOD, APPARATUS, AND COMPUTER-READABLE MEDIUM FOR OPTIMIZED DATA SUBSETTING

RELATED APPLICATION DATA

This application is a continuation of U.S. application Ser. No. 13/714,349 filed Dec. 13, 2012 (currently pending), the disclosure of which is hereby incorporated by reference in its entirety.

BACKGROUND

Enterprises frequently store large volumes of data across multiple tables in production databases, as well as in data warehouses. In order to effectively perform processes such as data testing, data analysis, and data reporting, it is sometimes necessary to extract information datasets from multiple tables at once.

For example, FIG. 1 shows a customer database that includes two tables, 101 and 102. The first table 101 lists the customer names and zip codes and the second table 102 lists IDs, customer names, and states. The data may be populated in the second table 102 in such a way that the value of the state field depends on the value of zip code field in the first table 101. In this case, if a user wishes to extract a subset of data for certain IDs, customer names, and corresponding states from table 102, then it will also be necessary to extract the corresponding zip code data from table 101 to ensure referential integrity. So, for example, if a user wanted to extract a data subset corresponding to the state value for the customer ID corresponding to ID=1, the data subset would include the values Robert and New York, as well as the value 11357.

FIG. 1 illustrates a simple example, but when there are many data dependencies between multiple tables, determining the appropriate subset of data to compile from all of the appropriate tables can be a complex and resource-intensive task. In many situations, the relationships between the tables result in one or more cycles when computing a data subset. As a result of these cycles, data subsetting processes frequently have to utilize a one-size-fits-all recursive solution to the problem of computing data subsets for large sets of data across multiple tables, whether or not the computation of a particular data subset involves cyclic relationships.

DETAILED DESCRIPTION

While methods, apparatuses, and computer-readable media are described herein by way of examples and embodiments, those skilled in the art recognize that methods, apparatuses, and computer-readable media for data subsetting are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

Applicants have discovered a way to isolate use-cases where the calculation of a data subset does not involve cyclic computation. Applicants additionally have discovered a means for optimized data sub setting which processes acyclical use-cases differently than cyclical use-cases, so that acyclical use-cases can be handled more efficiently using a non-recursive process.

Figure 1:
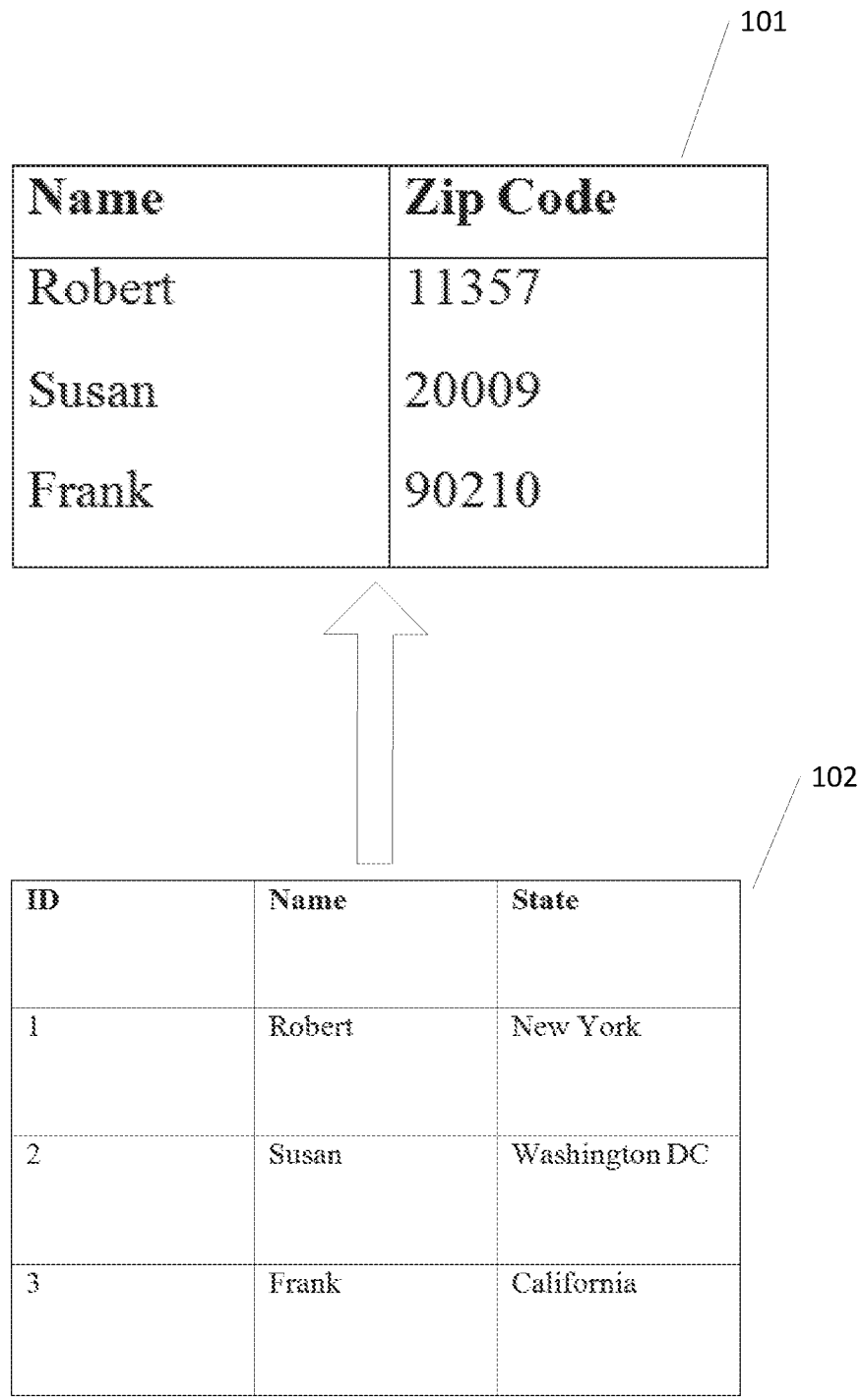
FIG. 1 illustrates an example of two data tables that can have a data dependency between them.
Figure 2A:
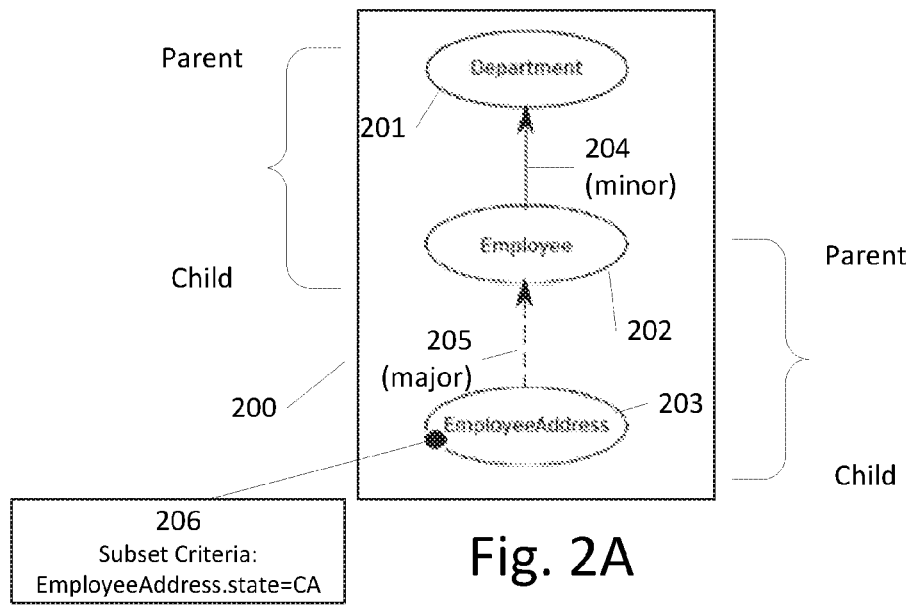
FIGS. 2A-2C illustrate an entity graph, the data tables corresponding to the entity graph, and subset tables corresponding to a subset criteria according to a disclosed embodiment.
Figure 2B:
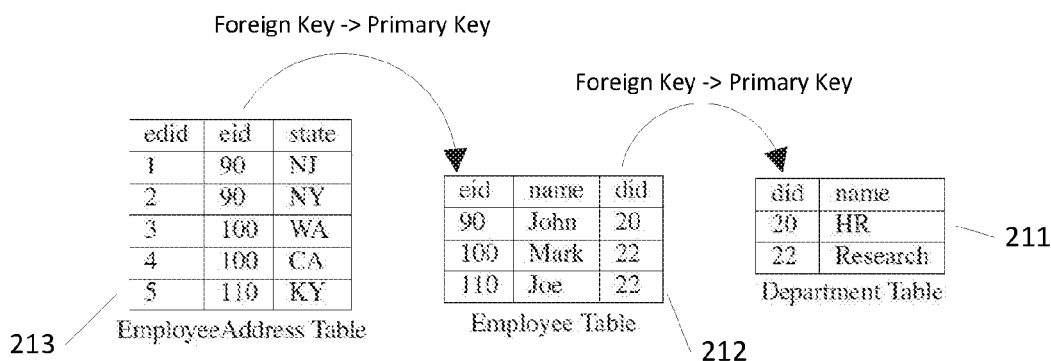

The tables in a database can be modeled using an entity graph, with the relationships between the tables also represented in the entity graph. The entity graph can be comprised of a plurality of entities representing a plurality of tables, such that every entity is related to some other entity in the entity graph. FIG. 2A illustrates an example entity graph involving three entities representing three data tables, with the corresponding three data tables shown in FIG. 2B. The three entities are Department 201 representing the Department Table 211, Employee 202 representing the Employee Table 212, and EmployeeAddress 203 representing the Employee Address Table 213. As shown in FIG. 2B, Department Table 211 includes a column for the department ID ("DID") and for the department name. The Employee Table 212 includes columns for employee ID ("EID"), employee name, and department ID. The EmployeeAddress Table 213 includes columns for employee address ID ("EDID"), employee ID, and state.

The edges, 204 and 205, in FIG. 2A represent relationships between the entities in the entity graph, and between the underlying tables which the entities represent. For example, edge 204 runs from Employee 202 to Department 201. This signifies that Employee 202 and Department 201 have a child-parent relationship, with Employee 202 being the child entity and Department 201 being the parent entity. A relationship is defined from a child table to a parent table when the child table contains a foreign key that references the primary key of the parent table. As shown in FIG. 2B, the Employee Table 212 contains the foreign key DID which is the primary key of the Department Table 211, and so the Employee Table is a child to the Department Table.

Similarly, edge 205 running from EmployeeAddress 203 to Employee 202 indicates that those two entities have a child-parent relationship, with EmployeeAddress 203 being the child and Employee 202 being the parent. This relationship can be verified by examining FIG. 2B to see that the EmployeeAddress Table 213 has a foreign key EID that is the primary key for the Employee Table 212.

Additional information that is represented in the entity graph 200 is the type of the relationship between each parent and child. The relationship can be a major relationship, represented here by the dotted line 205 between EmployeeAddress 203 and Employee 202, or a minor relationship, represented here by solid line 204 between Employee 202 and Department 201.

Referential integrity is a database concept that ensures that relationships between tables remain consistent. A major relationship is a parent-child relationship where referential integrity requires that the existence of every parent record is accompanied by the existence of every child record related to that parent record, in addition to the required constraint that the existence of every child record is accompanied by the existence of the parent record. A minor relationship is a parent-child relationship that only requires that the parent record be in the subset when a child record is in the subset. It does not trigger the fetching of all children records for a parent record like a major relationship.

Figure 2C:
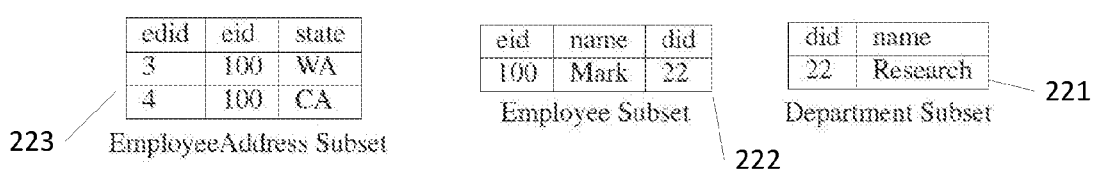

FIGS. 2A-2C illustrate the operation of major relationships and minor relationships during data subsetting. Dot 206 in FIG. 2A represents a user request for a subset of data such that EmployeeAddress.state=CA. As shown in FIG. 2C, the EmployeeAddress Subset 223 corresponding to this request includes the record where state=CA. That record also specifies an EDID of 4 and EID of 100. Since both major and minor relationships require the inclusion of a parent record that is related to a child record, the record with an EID of 100 is also fetched from the Employee Table 212 for inclusion in the Employee Subset 222. However, since the relationship between Employee 202 and EmployeeAddress 203 is a major relationship, with Employee being the parent, every child record that is related to the parent record must also be included in the subset. In this situation, that means that every record in the EmployeeAddress Table 213 that has an EID of 100 must be included in the EmployeeAddress Subset 223, so the record with EDID of 3, EID of 100, and state of WA is also fetched into the subset.

With regard to the Department Table 211, since the relationship between Department 201 and Employee 202 is a minor relationship, only the parent records in the Department Table 211 which correspond to the child records in the Employee Subset 222 need to be included in the subset. Since the one child record in the Employee Subset 222 specifies a DID of 22, the corresponding parent record with a DID of 22 is fetched from the Department Table 211 into the Department Subset 221. Note that the additional corresponding records in the Employee Table 212 which have a DID of 22 are *not* fetched into the Employee Subset 222 as the relationship between Employee 202 and Department 201 is not a major relationship but rather a minor relationship.

Figure 3:
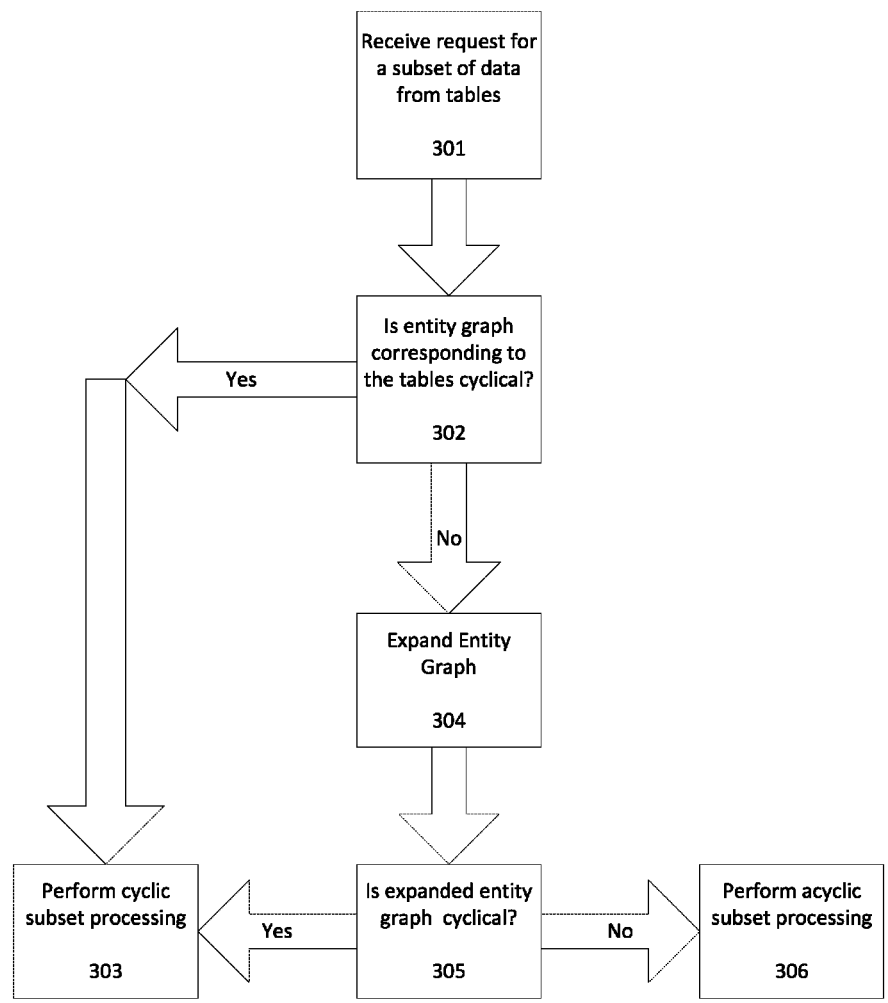
FIG. 3 illustrates a flowchart for processing data subset requests and isolating acyclic entity graphs from cyclic entity graphs according to a disclosed embodiment.

Having explained the components of an entity graph and how they relate to a set of tables, FIG. 3 illustrates a method which utilizes entity graphs to isolate data subsetting requests which do not involve cycles. At step 301 a request for a subset of data from a plurality of tables is received. The request can include one or more criteria for the data subset. For example, in the preceding example of FIG. 2A, the subset criterion was that the value of EmployeeAddress.state be equal to "CA." The subset criteria can be used to specify which data needs to be in the data set by providing filter criteria to one or more tables. In addition to providing expressions to filter the required rows in the one or more tables, subset criteria can further restrict the dataset by specifying a percentage of qualifying rows to include in the result. When criteria are specified for multiple tables forming an Entity, those criteria can be combined using AND and OR connectives to specify how the provided criteria are to be used together to produce the final dataset.

At step 302, it is determined whether an entity graph corresponding to the plurality of tables is cyclical (whether it contains one or more cycles). As discussed earlier, the entity graph includes a plurality of entities representing the plurality of tables, edge data corresponding to a plurality of edges between the entities which represents the relationships between the tables and indicates a parent entity and child entity, and relationship data which indicates whether the relationships between the parent entities and child entities are major relationships or minor relationships.

Figure 4:
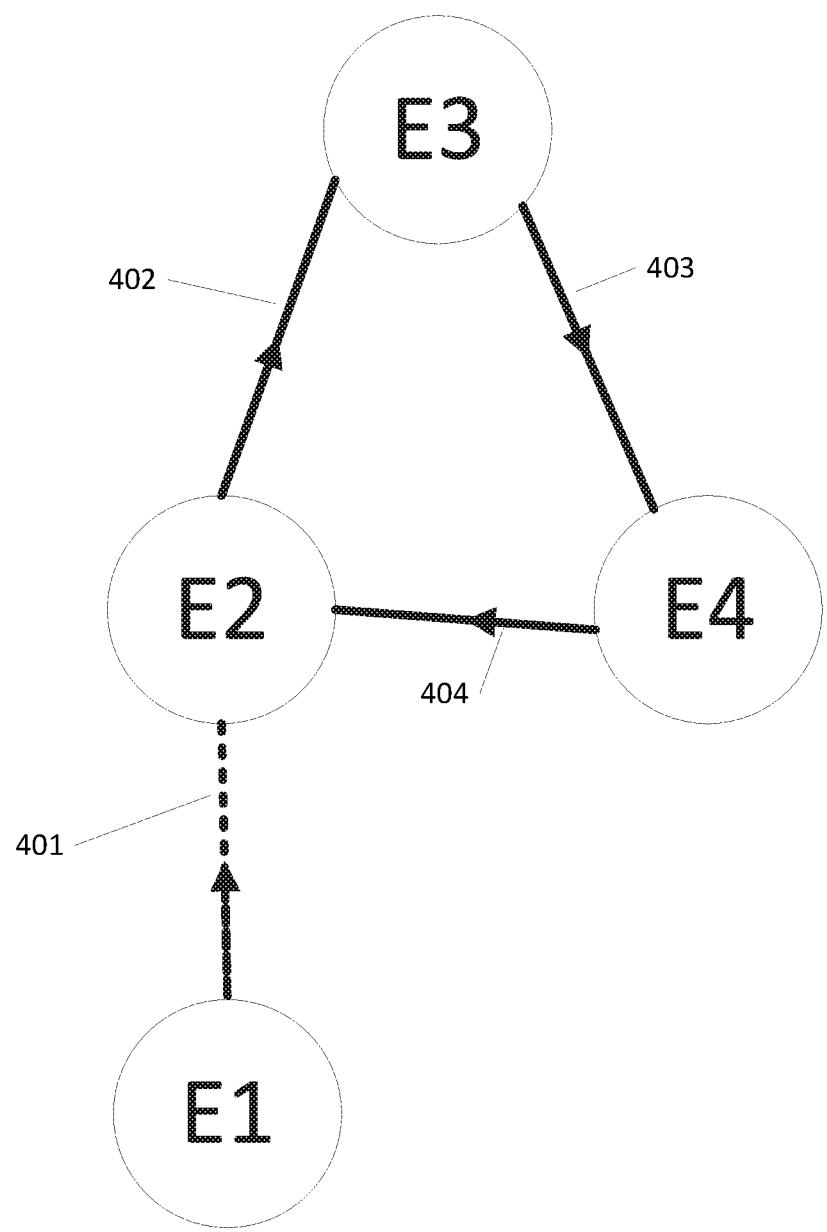
FIG. 4 illustrates an entity graph having a cycle according to a disclosed embodiment.

An entity graph contains cycles if there is a path $E_1 \rightarrow E_2 \rightarrow \ldots E_1$ where each $E_i$ represents an entity and each arrow is a relationship edge. FIG. 4 illustrates an example of an entity graph containing a cycle. Since the edges run from child entities to parent entities, we know that E2 is the parent of E1, E3 is the parent E2, E4 is the parent of E3, and E2 is the parent of E4. Additionally, the dashed edge 401 indicates that the relationship between E2 and E1 is a major relationship, while the solid edges 402, 403, and 404 indicate minor relationships. The cycle in this entity graph is $E_2 \rightarrow E_3 \rightarrow E_4 \rightarrow E_2$. Cycles can be detected through a variety of means. For example, all possible outgoing paths from each entity can be traversed to determine whether any path leads back to the original entity.

Returning to FIG. 3, if the entity graph corresponding to the plurality of tables contains a cycle, cyclic subset processing is performed at step 303. If the entity graph does not contain a cycle, then the entity graph is expanded at step 304 to generate an expanded entity graph. At step 305 it is determined whether the expanded entity graph is cyclical. If the expanded entity graph contains no cycles, then acyclic subset processing is performed at step 306. Otherwise, if the expanded entity graph contains one or more cycles, then cyclic subset processing is performed at step 303.

Figure 5:
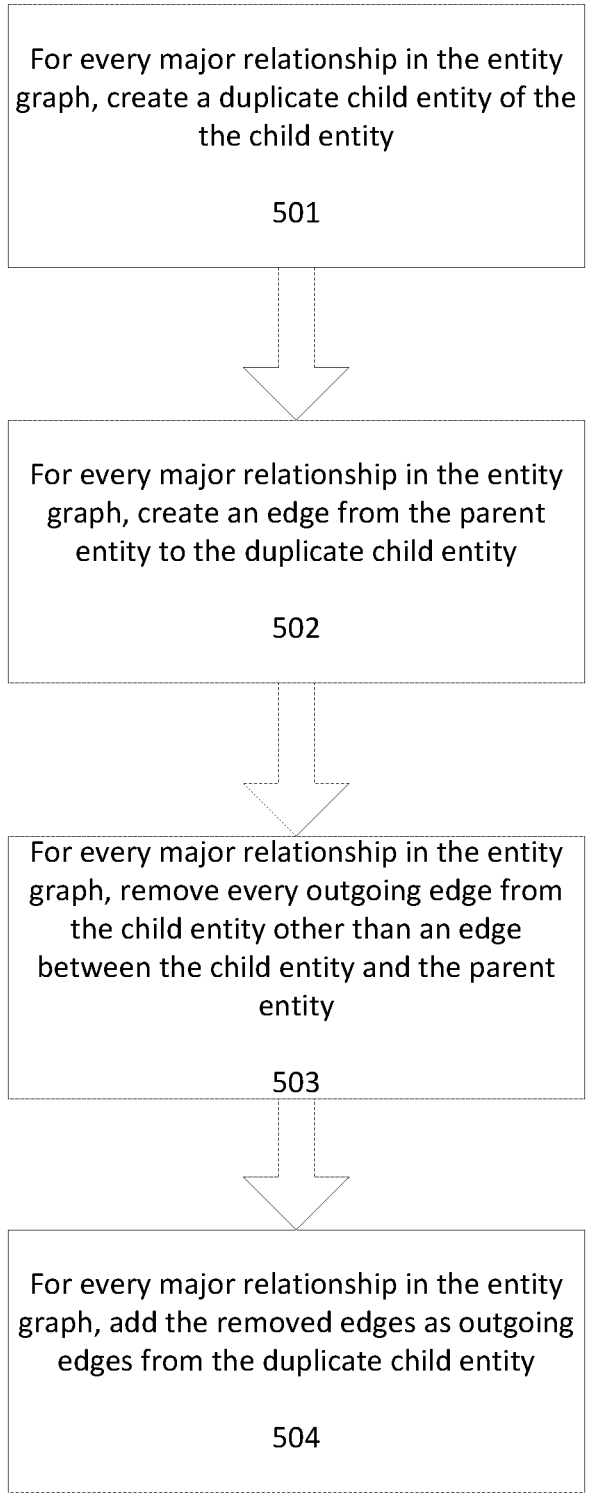
FIG. 5 illustrates a flowchart for expanding an entity graph to generate an expanded entity graph according to a disclosed embodiment.

The entity graph expansion process will now be described with respect to FIG. 5. At step 501, for every major relationship in the entity graph, a duplicate child entity is created of the child entity in the major relationship. Note that if there is an entity that is a child entity in two major relationships, than that means that two duplicate child entities will be created from that entity. At step 502, for every major relationship in the entity graph, an edge is created from the parent entity to the duplicate child entity that was created in step 501. At step 503, for every major relationship in the entity graph, every outgoing edge from the child entity is removed other than the edge between the child entity and parent entity in that relationship. At step 504, for every major relationship, the removed outgoing edges are added as outgoing edges to the duplicate child entity.

Figure 6A:
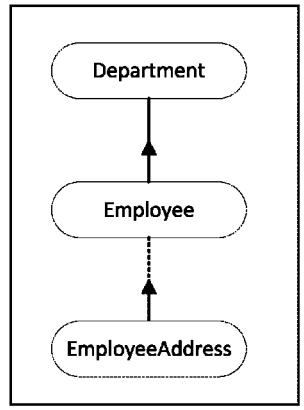
FIGS. 6A-6C illustrate an example of the expansion process that results in an acylic expanded entity graph according to a disclosed embodiment.
Figure 6B:
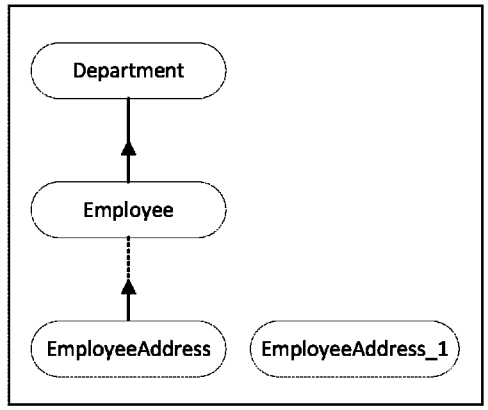
Figure 6C:
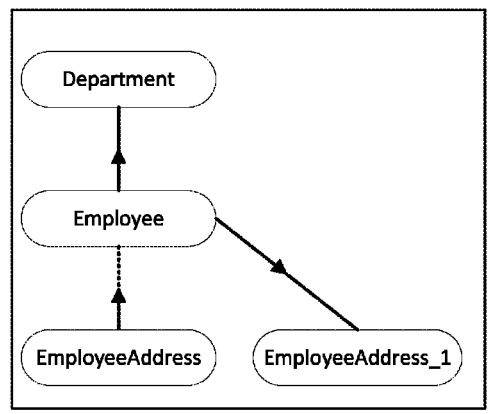

FIGS. 6A-6C illustrate the application of the expansion steps to the entity graph previously discussed with regard to FIG. 2A. FIG. 6A illustrates the initial version of the entity graph, with a major relationship between Employee and EmployeeAddress and a minor relationship between Department and Employee. FIG. 6B illustrates an intermediate version of the entity graph after step 501, showing that a duplicate entity, EmployeeAddress_1, has been created from EmployeeAddress, which is the child entity in the major relationship with Employee. FIG. 6C illustrates the entity graph after step 502, showing that an edge has been created from the parent entity in the major relationship, Employee, to the duplicate child entity, EmployeeAddress_1. Since steps 503 and 504 of the expansion process involve outgoing edges from a child in a major relationship other than the outgoing edge to the parent, and EmployeeAddress has no other outgoing edges, those steps do not modify the entity graph and the final expanded version of the graph is shown in FIG. 6C. In this case, the expanded entity graph has no cycles, and acyclic subset processing can be performed.

Figure 7A:
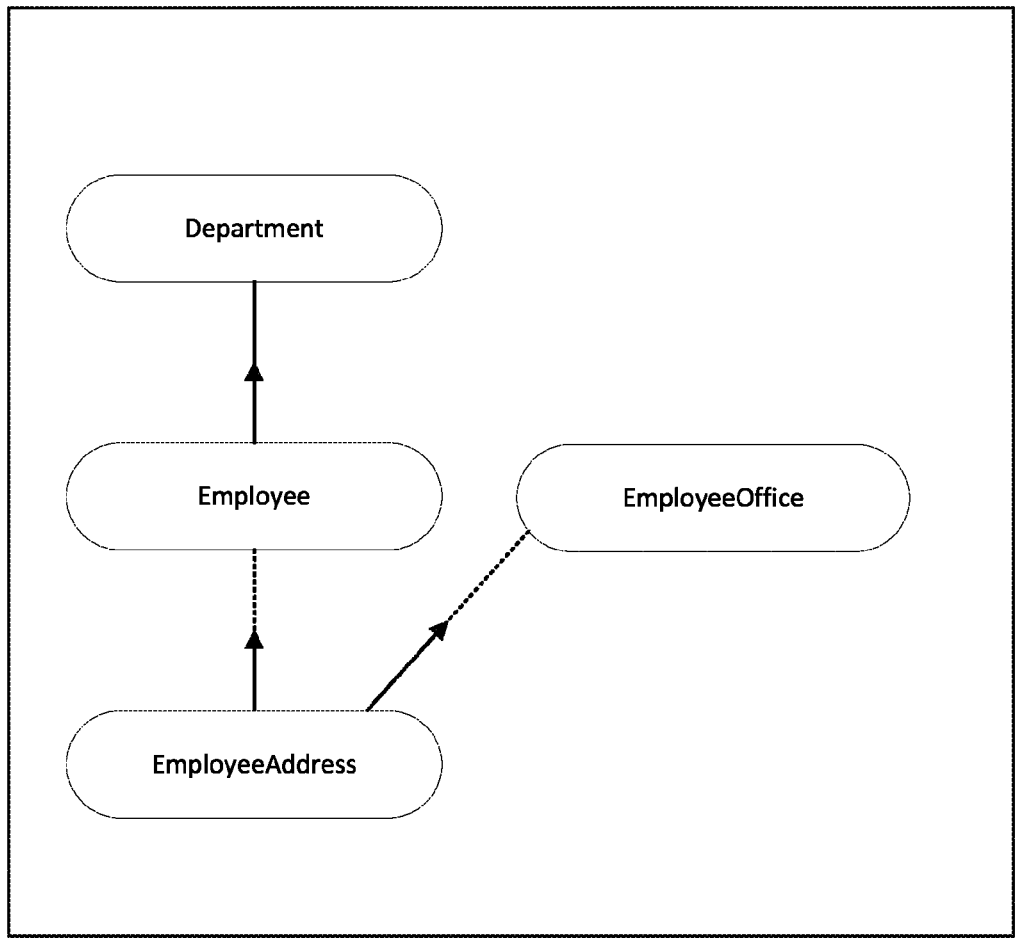
FIGS. 7A-7E illustrate an example of the expansion process that results in a cylic expanded entity graph according to a disclosed embodiment.

The entity graph expansion process may reveal cycles in entity graphs which do not otherwise show cycles pre-expansion. One example of this is an entity graph having an entity with two outgoing major relationship edges. Referring to FIG. 7A, an entity graph is shown in which EmployeeAddress is a child entity in two major relationships. The first major relationship is with the Employee Entity as in the previous entity graph shown in FIG. 6A. The second major relationship is with an EmployeeOffice entity, which can represent a table containing office assignments of employees based on their addresses.

Figure 7B:
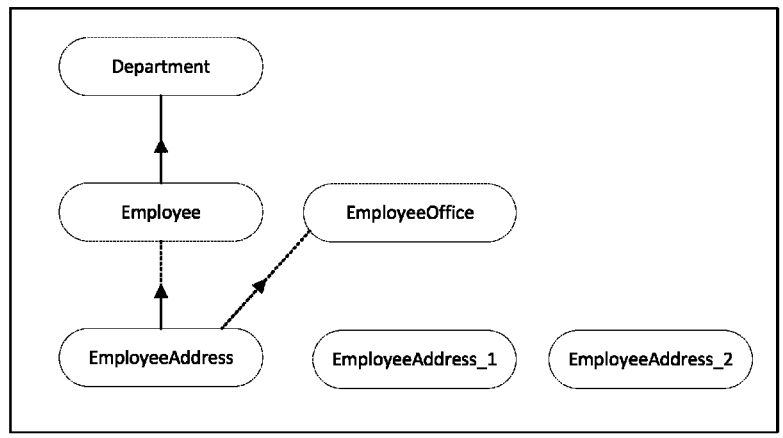

FIG. 7B shows the intermediate version of the entity graph after the first step in the expansion process. Two duplicate EmployeeAddress entities have been created, with EmployeeAddress_1 corresponding to the duplicate created as a result of EmployeeAddress being the child in the major relationship with Employee and EmployeeAddress_2 corresponding to the duplicate created as a result of EmployeeAddress being the child in the major relationship EmployeeOffice.

Figure 7C:
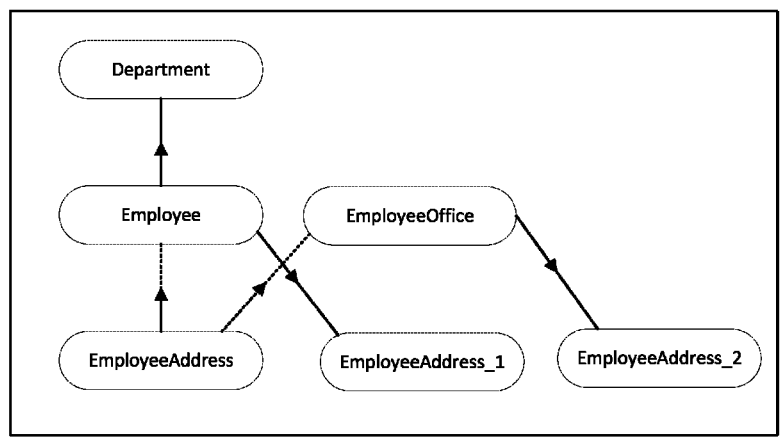

FIG. 7C shows the intermediate version of the entity graph after the second step in the expansion process. An outgoing edge has been added from the parent Employee to the first duplicate child EmployeeAddress_1 and another outgoing edge has been added from the parent EmployeeOffice to the second duplicate child EmployeeAddress_2.

Figure 7D:
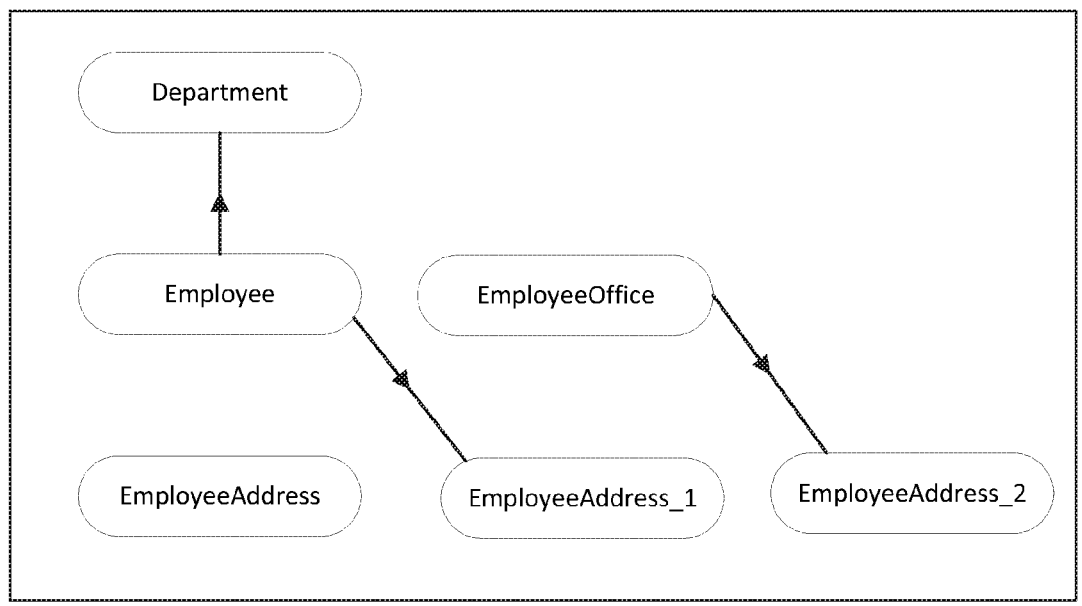

FIG. 7D shows the intermediate version of the entity graph after the third step of removing all outgoing edges from the child entity in a major relationship except for the outgoing edge to the parent in that relationship. To elaborate on this step with regard to FIGS. 7C-7D, one major relationship that is processed is the major relationship between EmployeeAddress and Employee. The only other outgoing edge from EmployeeAddress is the outgoing edge to Employee Office, so it is removed. Another major relationship is the one between EmployeeAddress and EmployeeOffice. Since the only other outgoing edge from the child in that relationship, EmployeeAddress, is the edge to Employee, it is also removed. This leaves EmployeeAddress with no remaining outgoing edges.

Figure 7E:
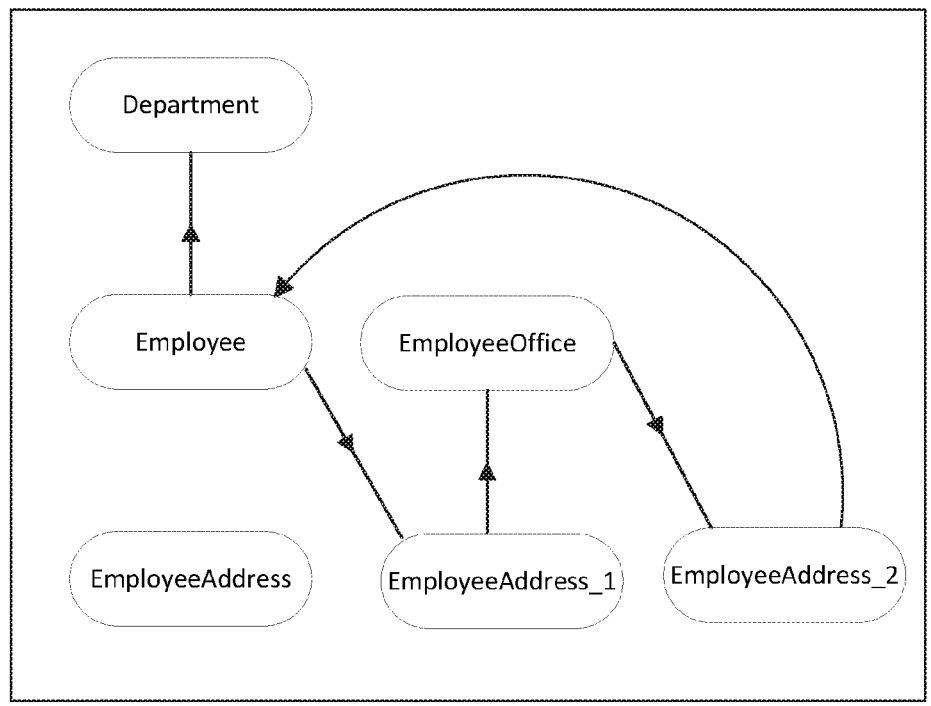

Referring now to FIG. 7E, the final expanded entity graph is shown after the execution of the fourth step in the expansion process. For the major relationship EmployeeAddress→Employee, EmployeeAddress_1 was the duplicate child and EmployeeAddress→EmployeeOffice was the outgoing edge that was removed in the third step, so this edge is added as an outgoing edge to the duplicate child, resulting in edge EmployeeAddress_1→EmployeeOffice.

Similarly, for the major relationship EmployeeAddress→EmployeeOffice, EmployeeAddress_2 was the duplicate child and EmployeeAddress→Employee was the outgoing edge that was removed in the third step, so this edge is added as an outgoing edge to the duplicate child, resulting in edge EmployeeAddress_2→Employee.

By expanding the entity graph to the expanded entity graph in FIG. 7E, the system can detect a cycle that was not present in the pre-expanded entity graph, the cycle Employee→EmployeeAddress_1→EmployeeOffice→EmployeeAddress_2→Employee. This means that the dependencies of the data tables which are represented by the entities in the entity graph involve a cycle and that the data subsetting process should be carried out using cyclic subset processing.

When it is determined that the entity graph and the expanded entity graph do not contain any cycles, the data subsetting can be performed via acyclic subset processing. The acyclic subset processing can be carried out in an optimized manner through non-recursive means.

Figure 8:
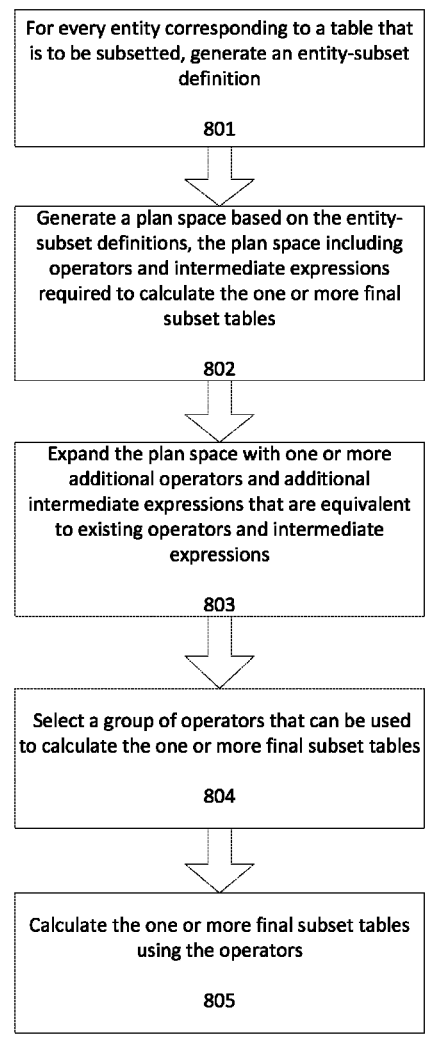
FIG. 8 illustrates a flowchart for acyclic data subset processing according to a disclosed embodiment.

Referring now to FIG. 8, the steps involved in acyclic subset processing will now be described. At step 801, for every entity corresponding to a table that is to be subsetted, an entity-subset definition is generated. The entity-subset definition defines the portion of the requested subset that is in the table represented by the entity. In other words, the entity-subset definition defines a subset table of a particular table in the original plurality of tables for some input subset criteria.

Figure 9A:
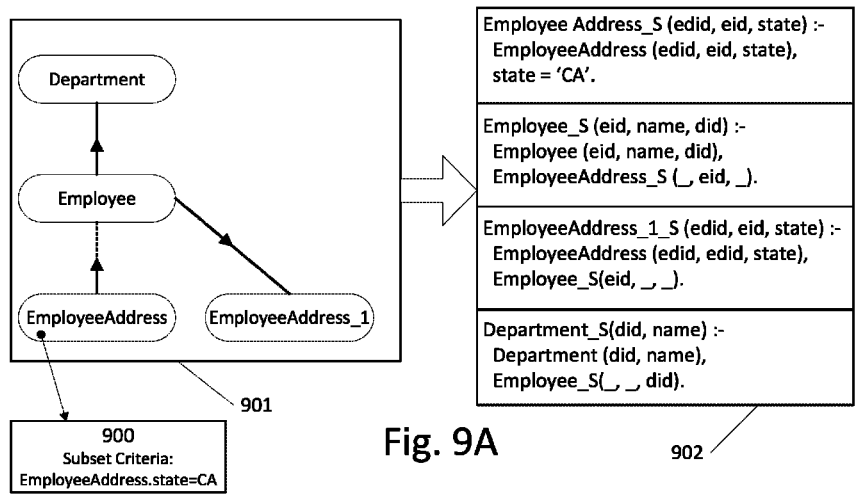
FIGS. 9A-9B illustrate the entity-subset definitions corresponding to a plurality of subset tables and the corresponding explanations according to a disclosed embodiment.

FIG. 9A shows a set of entity-subset definitions. Using the earlier example of an expanded entity graph that is suitable for acyclic processing 901, and the earlier subset criteria of EmployeeAddress.state=CA 900, the corresponding entity-subset definitions 902 are generated. Each of the entity-subset definitions 902 are suffixed with "S" and can be thought of as defining the subset tables which will contain the requested subset of data through one or more expressions. So, for example, Employee_S defines the table containing the subset of data in the Employee table which corresponds to the subset criteria.

Entity-subset definitions are generated for all of the entities in the expanded entity graph that are to be part of the subsetting process, even duplicate entities, such as EmployeeAddress_1, which has the entity-subset definition EmployeeAddress_1_S. The entities to be included in the subsetting process can be determined by, for example, assessing which of the entities in an entity graph are connected to the entity to which the subset criteria applies. When there is an entity-subset definition that corresponds to a duplicate entity, such as EmployeeAddress_1_S, that entity-subset definition defines the final subset of the table which corresponds to the subset criteria 900. So in FIG. 9A, EmployeeAddress_1_S defines the subset table for the rows of EmployeeAddress that will part of the final data subset.

Figure 9B:
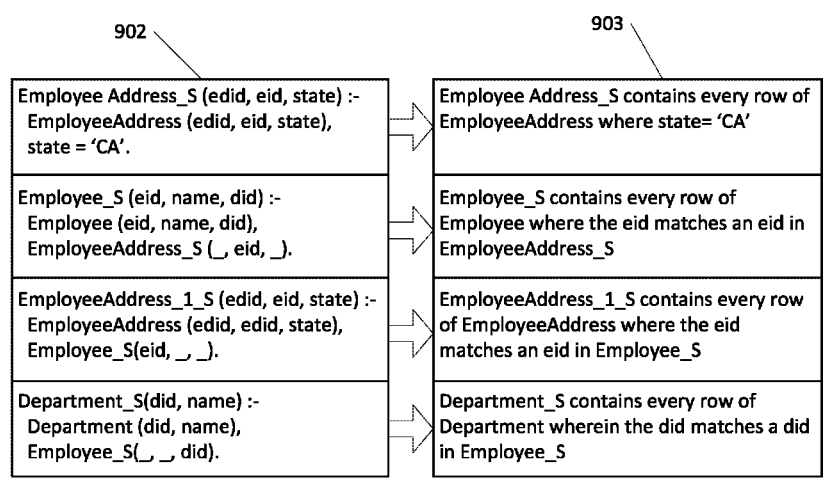

The entity-subset definitions are shown using the syntax and form of a Datalog program, which is a declarative logic programming language that is syntactically a subset of the logic programming language Prolog. Of course, any suitable logic programming language or construct could be used to generate the entity-subset definitions. Turning to FIG. 9B, the plain language meaning of each of the entity-subset definitions is shown with object 903. For example, the subset defined by Employee_S contains every row of Employee where the eid matches the eid in the subset EmployeeAddress_S.

Turning back to FIG. 8, at step 802, the entity-subset definitions are used to generate a relational plan space, which is representation utilized in the field of Artificial Intelligence as a way of representing a backward search from a particular goal or goals. In this case, the goals are the subset tables defined through entity-subset definitions which correspond to the subset criteria.

A plan space corresponding to the entity-subset definitions of FIG. 9A is shown in FIG. 10. The plan space includes diamond shaped nodes 1001, 1002, 1003, and 1004 which denote the subset tables EmployeeAddress_S, Employee_S, EmployeeAddress_1_S, and Department_S defined by the entity-subset definitions. The rectangular nodes, such as node 1005, denote intermediate expressions whose results are evaluated by the oval operators, such as node 1006. Having multiple edges entering a rectangular node, such as node 1007, indicates that the value of that expression is reused for the computation of other intermediate results.

Figure 10A:
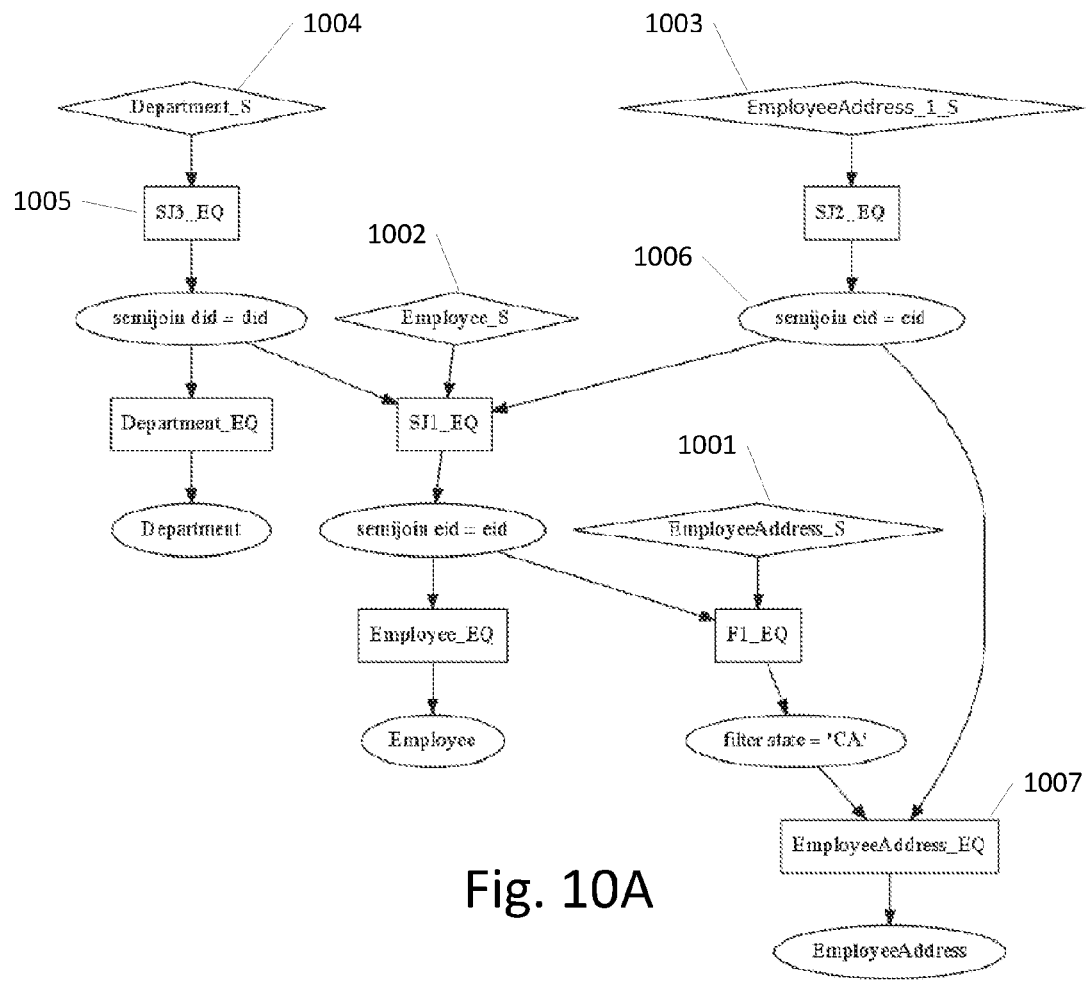
FIGS. 10A-10B illustrate a plan space generated from the entity-subset definitions of FIGS. 9A-9B according to a disclosed embodiment.
Figure 10B:
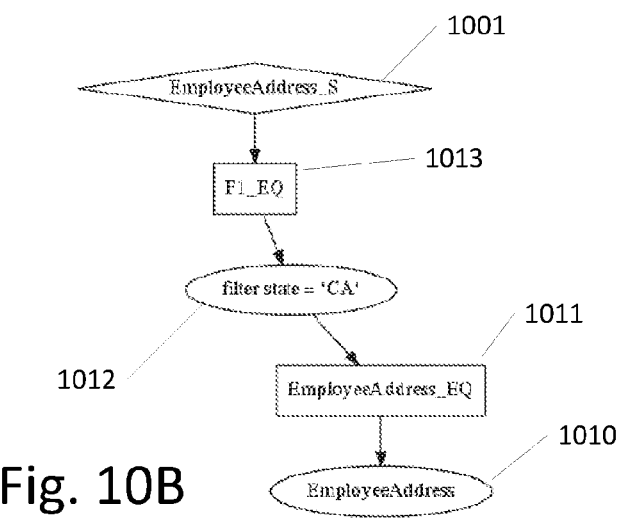

The plan space can be thought of as flowing from the bottom upwards to show the paths that can result in the subset tables. For example, FIG. 10B shows a portion of the plan space relating to the subset table EmployeeAddress_S 1001. At operator 1010, the full set of data from the EmployeeAddress table may be retrieved. The data can be expressed as intermediate expression 1011. That intermediate expression 1101 can be evaluated by the filter operator 1012 which filters records where the state=CA. The results of the filter operation can be expressed in intermediate expression 1013, which can be the result subset table for EmployeeAddress_S.

By evaluating these steps using the data in table 213 of FIG. 2B, we observe that only one of the records in subset table 223 of FIG. 2C is included in the result subset. As stated earlier, this is because the subset table corresponding to EmployeeAddress_S is not the final data subset table of the EmployeeAddress table corresponding to the subset criteria in this example. Since a duplicate child entity, EmployeeAddress_1, was created during the expansion phase, node 1003 in FIG. 10A represents the final data subset table of the EmployeeAddress table that corresponds to the subset criteria and entity graph.

Returning to FIG. 8, after the plan space has been generated at step 802, the plan space can be expanded at step 803. This occurs by generating one or more additional operators and intermediate expressions that are equivalent to existing operators and intermediate expressions using equivalence rules. An equivalence rule says that E1↔E2, meaning an expression E1 has the same results as expression E2. For example, from standard relational algebra, we know that: semijoin(A, B)↔project$_A$ (innerjoin (A, B))

This rewrite rule means that the semijoin operation is equivalent to an innerjoin operation between the same two tables followed by a projection (with duplicate elimination) of the columns of the first table.

Of course, a variety of equivalence rules can be used to expand the plan space, such as logical equivalence rules and relational algebra equivalence rules. Equivalence rules can be utilized which relate to selection operations, projection operations, joins, set operations, or any other relevant operations.

The application of equivalence rules to expand the plan space provides a larger plan space with alternate, but equivalent, evaluation strategies for the expressions in the plan space. In other words, the expanded plan space provides multiple different paths for computing each of the final data subsets from each of the plurality of tables to be subsetted.

After the plan space is expanded, a group of operators is selected at step 804 which can be used to calculate one or more final subset tables corresponding to the subset criteria at step 805. In this example, a group of operators (and corresponding paths) can be chosen from the variety of possible alternate (but equivalent) operators in the plan space in order to generate the final subset tables of an EmployeeAddress subset table, Employee subset table and Department subset table that correspond to the subset criteria EmployeeAddress.state=CA and the (major or minor) relationships between the tables.

The selection of the group of operators to use can be cost-based, with cost values being assigned to each of the operators to reflect the desirability and/or computational cost of utilizing that operator. The cost evaluation of the plan can be performed with knowledge of the physical sources and potentially disparate hardware resources involved in the subsetting processes. For example, if the tables being subsetted are relational, then the goal can be to achieve maximum pushdown of operations to the database below since the operands in the operation are already stored in relation to each other. On the other hand, if pushdown is not possible (because the input source is non-relational, or the two sides of a join are from different physical sources), costs can be assigned to subsequent operators based on the costs of executing the operators in a particular workflow engine, such as the Informatica PowerCenter workflow engine. Of course, any suitable middleware or middleware components capable of retrieving the data from the sources can be utilized to calculate one or more subsets, and the operator cost values can be based on the costs of executing the middleware or middleware components.

By separating the subsetting algorithms and plan generation from the process of assigning computational costs, the present system ensures that the lowest cost plan is selected for data subsetting in a variety of situations and infrastructures. The algorithms up to the cost assignment process are unaware of the physical location or nature of the sources. This unifies the code required to compute the subset and makes it independent of the nature of the sources, while ensuring that the final evaluation is performed in an optimal manner that takes into consideration physical properties of the source.

Figure 11:
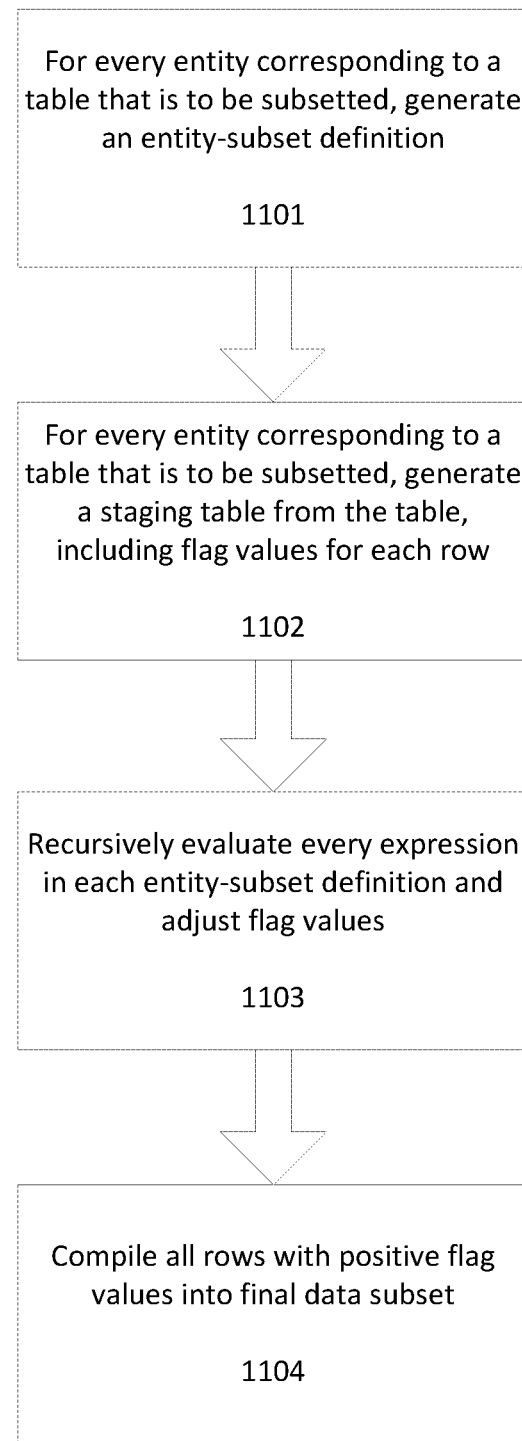
FIG. 11 illustrates a flowchart for cyclic data subset processing according to a disclosed embodiment.

Referring back to FIG. 3, the cyclic subset processing step 303 will now be described in greater detail. FIG. 11 is flowchart showing the steps in involved in cyclic subset processing according to a disclosed embodiment. At step 1101, for every entity corresponding to a table that is to be subsetted, an entity-subset definition is generated. This step is the same as step 801 in FIG. 8 corresponding to acyclic subset processing, and is discussed at length earlier in this specification. The primary difference in the resulting entity-subset definitions for the cyclic processing case is that at least one of the entity-subset definitions will be defined recursively, in terms of itself, since there is a loop in the entity graph or expanded entity graph.

At step 1102, for every entity corresponding to a table that is to be subsetted, a staging table is generated from the table. The staging table includes only those columns that are required to evaluate the expressions which form entity-subset definitions of step 1101. Additionally, the staging table includes a Boolean column whose value indicates if a certain row is to be included in the final subset. When initially loading the staging table, the Boolean value is set to true only for rows that satisfy the subset criteria.

Figure 12:
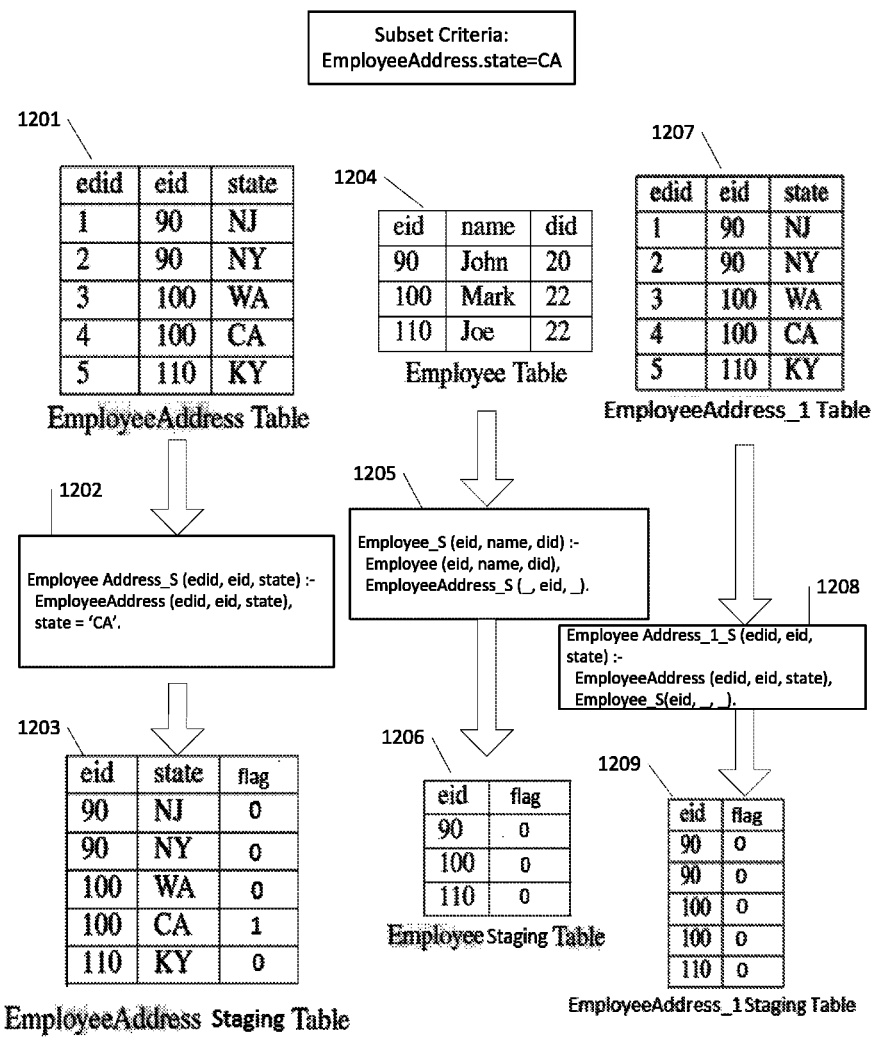
FIG. 12 illustrates the generation of staging tables according to a disclosed embodiment.

FIG. 12 illustrates an example of an EmployeeAddress staging table 1203 generated from an EmployeeAddress table 1201 and based on the entity-subset definition 1202. Similarly, Employee staging table 1206 is generated from Employee table 1204 and is based on the entity-subset definition 1205. Additionally, EmployeeAddress_1 staging table 1209 is generated from EmployeeAddress_1 table 1207 and is based on the entity subset definition 1208. As shown in the EmployeeAddress staging table 1203, the "edid" column has been eliminated because it is not required for the evaluation of any of the expressions in the entity-subset definitions. Note that the "eid" column is not eliminated because it is used for the evaluation of the Employee entity-subset definition 1205 corresponding to the Employee staging table 1206. Similarly, the "state" column is not eliminated as it is used to evaluate the entity-subset expression 1202. Additionally, the flag column in the Employee-Address staging table 1203 and Employee staging table 1206 indicates whether a particular row in the staging table corresponds to a row that should be included in the final subset. As shown in FIG. 12, the flag for the row with a state equal to "CA" is set to one, or true, in the EmployeeAddress staging table 1203 since this row meets the initial subset criterion. None of the flags in the Employee staging table 1206 are set to true since the initial subset criteria does not involve the Employee table 1204. EmployeeAddress_1 staging table 1209 only includes a column corresponding to eid and a flag column, since eid is the only column used in the evaluation of the relevant entity subset definition 1208. Note that in this example, there are only three tables and so the "did" column of the Employee table 1204 can also be removed from the Employee staging table 1206 since there is no Department table or Department entity-subset definition.

Returning to FIG. 11, at step 1103, every expression in each entity-subset definition is recursively evaluated and the flag values in the corresponding staging table are updated so that the rows which satisfy the expressions in the entity-subset definition have their flags set to true.

Figure 13:
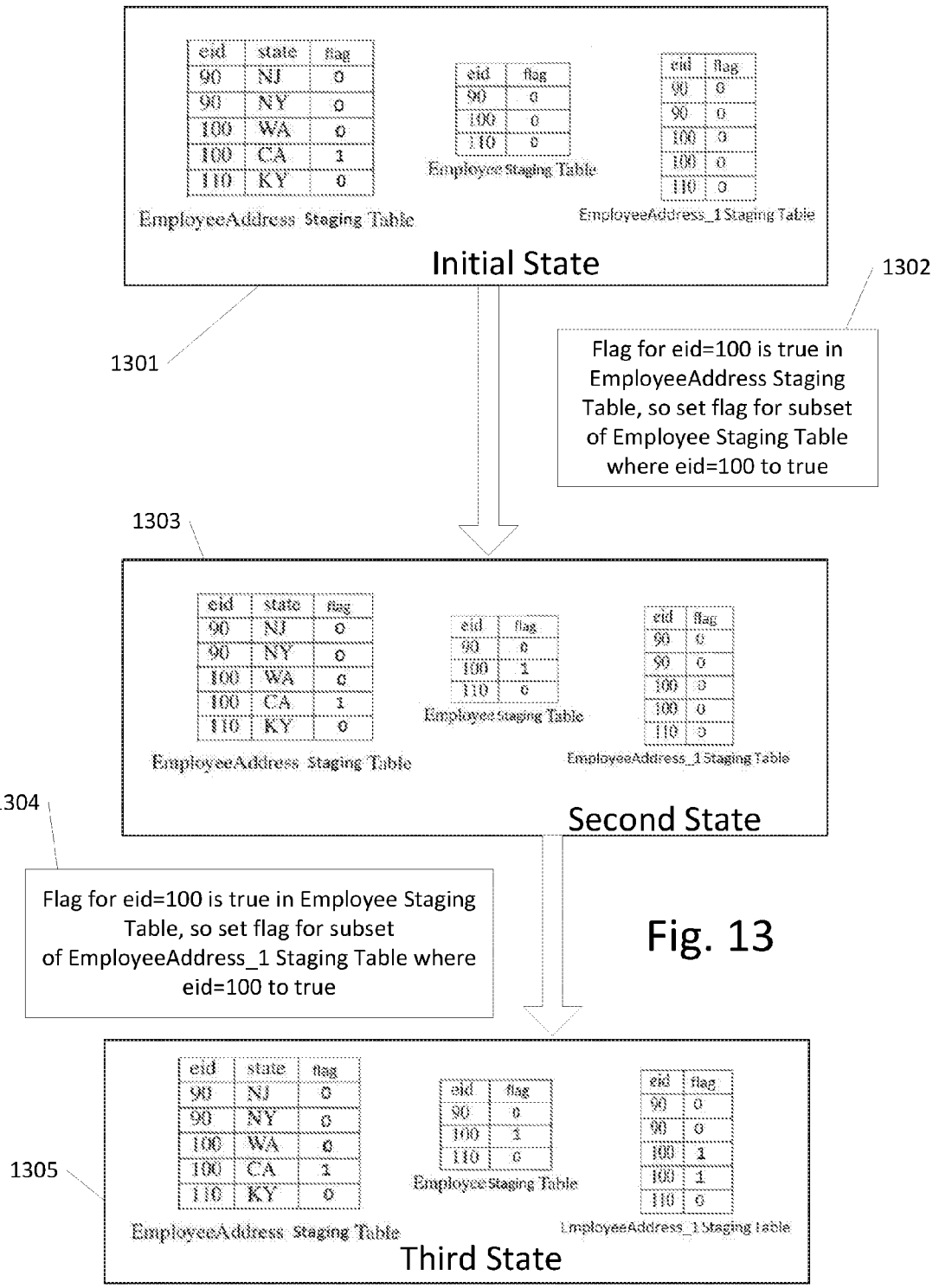
FIG. 13 illustrates one step in the recursive evaluation process according to a disclosed embodiment.

FIG. 13 shows a sample recursive evaluation carried out on the three staging tables of FIG. 12. The initial state 1301 shows the staging tables as they were initially populated, with only the flag in the EmployeeAddress staging table for the row where state="CA" set to true, and all other flags in the three tables set to false, or zero. After the initial state 1301, the expressions in the entity-subset definitions for all of the staging tables are evaluated. The entity-sub set definition for the Employee subset table specifies that the rows corresponding to eids that are in the EmployeeAddress subset table will be in the Employee subset table. Since a flag value of true indicates that a row is in the subset table, and the row with an eid of 100 has a flag value of true, then the flag values for all rows in the Employee table which also have an eid of 100 are set to true in step 1302. This results in the staging tables being updated to the second state 1303. After this, all of the expressions in the entity-subset definitions are again evaluated, leading to all of the flag values of the rows in the EmployeeAddress_1 staging table which have an eid of 100 being set to true in step 1304. Since these are the only three tables in this example and the entity-subset rules are not complex, the third state 1305 is the final state and there are no more states in the recursive solution for this subset.

However, if there are more states, then the process can continue updating flags and rechecking the entity-subset definitions until no more flags were changed. Once there is no more change in the staging tables, then step 1104 in FIG. 11 can be performed to compile all of the rows with positive flag values in the final data subset corresponding to the subset criteria.

The compilation of all of the rows with positive flags can be performed through a join operation of the staging tables and the original input tables used to generate the staging tables, such that only those rows with a flag value of true are copied into the target table. Of course, there are other ways to use the flag values in the staging tables to extract or compile the relevant rows from the original tables to generate the final subsets, and the systems disclosed herein are not limited to any one technique.

Figure 14:
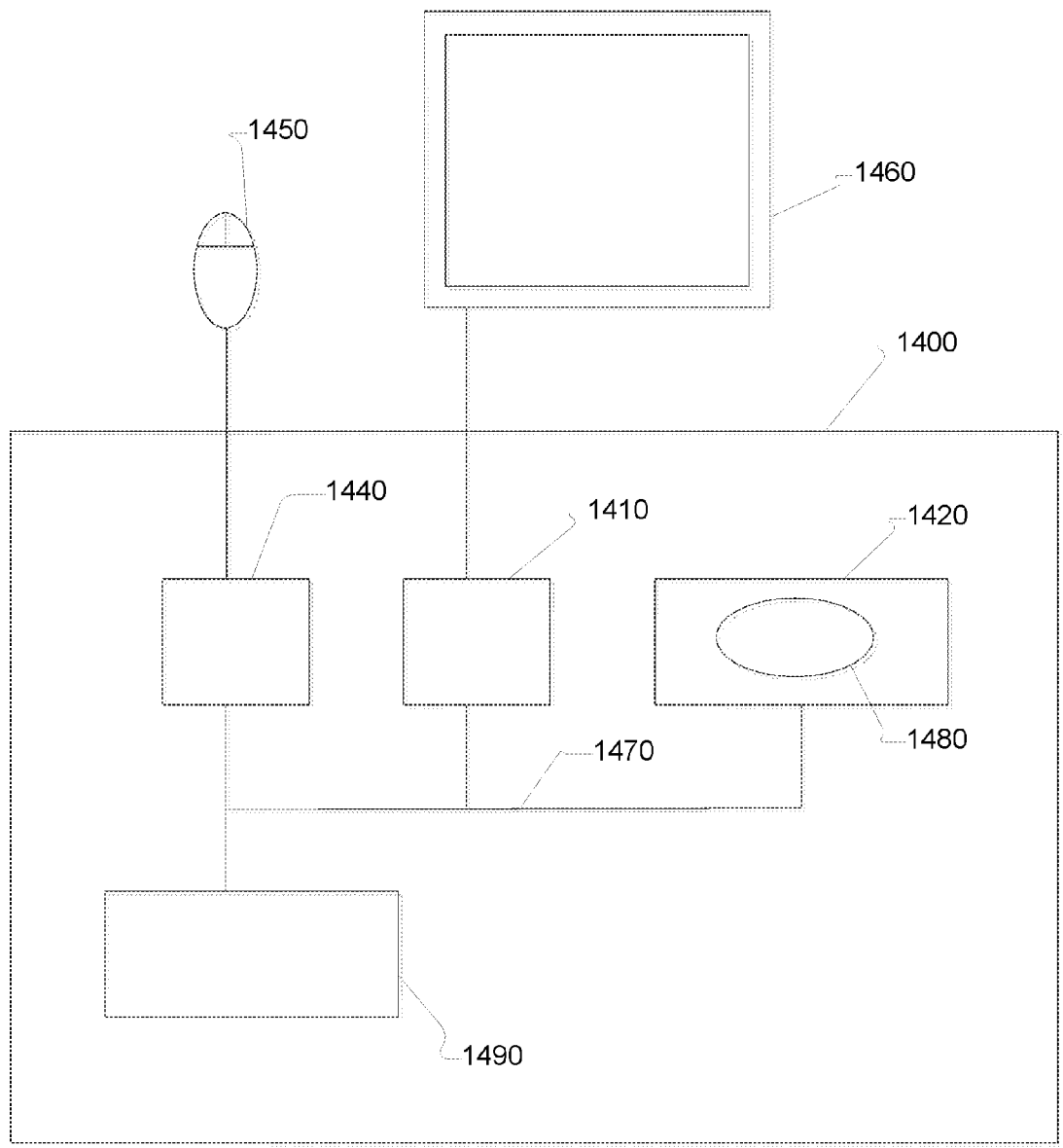
FIG. 14 illustrates an exemplary computing environment that can be used to carry out the method for data subsetting according to a disclosed embodiment.

One or more of the above-described techniques can be implemented in or involve one or more computer systems. FIG. 14 illustrates a generalized example of a computing environment 1400. The computing environment 1400 is not intended to suggest any limitation as to scope of use or functionality of a described embodiment.

With reference to FIG. 14, the computing environment 1400 includes at least one processing unit 1410 and memory 1420. The processing unit 1410 executes computer-executable instructions and may be a real or a virtual processor. In a multi-processing system, multiple processing units execute computer-executable instructions to increase processing power. The memory 1420 may be volatile memory (e.g., registers, cache, RAM), non-volatile memory (e.g., ROM, EEPROM, flash memory, etc.), or some combination of the two. The memory 1420 may store software instructions 1480 for implementing the described techniques when executed by one or more processors. Memory 1420 can be one memory device or multiple memory devices.

A computing environment may have additional features. For example, the computing environment 1400 includes storage 1440, one or more input devices 1450, one or more output devices 1460, and one or more communication connections 1490. An interconnection mechanism 1470, such as a bus, controller, or network interconnects the components of the computing environment 1400. Typically, operating system software or firmware (not shown) provides an operating environment for other software executing in the computing environment 1400, and coordinates activities of the components of the computing environment 1400.

The storage 1440 may be removable or non-removable, and includes magnetic disks, magnetic tapes or cassettes, CD-ROMs, CD-RWs, DVDs, or any other medium which can be used to store information and which can be accessed within the computing environment 1400. The storage 1440 may store instructions for the software 1480.

The input device(s) 1450 may be a touch input device such as a keyboard, mouse, pen, trackball, touch screen, or game controller, a voice input device, a scanning device, a digital camera, remote control, or another device that provides input to the computing environment 1400. The output device(s) 1460 may be a display, television, monitor, printer, speaker, or another device that provides output from the computing environment 1400.

The communication connection(s) 1490 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 1400, computer-readable media include memory 1420, storage 1440, communication media, and combinations of any of the above.

Of course, FIG. 14 illustrates computing environment 1400, display device 1460, and input device 1450 as separate devices for ease of identification only. Computing environment 1400, display device 1460, and input device 1450 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 1400 may be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A method for data sub setting executed by one or more computing devices, the method comprising:
   receiving, by at least one of the one or more computing devices, a request for a subset of data from a plurality of tables, the request comprising subset criteria;
   generating, by at least one of the one or more computing devices, an entity graph corresponding to the plurality of tables, the entity graph comprising:
      a plurality of entities, each entity representing a table in the plurality of tables;
      edge data corresponding to a plurality of edges between the entities, wherein the edge data identifies a parent entity and a child entity, and each edge runs from a child entity to a parent entity; and
      relationship data corresponding to a plurality of relationships between the entities, wherein the relationship data identifies whether the relationship between the parent entity and the child entity is a major relationship or a minor relationship;
   expanding, by at least one of the one or more computing devices, the entity graph to generate an expanded entity graph based at least in part on a determination that the entity graph does not contain a cycle; and
   performing, by at least one of the one or more computing devices, acyclic subset processing using the expanded entity graph based at least in part on a determination that the entity graph does not contain a cycle and a determination that the expanded entity graph does not contain a cycle.

2. The method of claim 1, wherein expanding, by at least one of the one or more computing devices, the entity graph to generate an expanded entity graph comprises:
   for every major relationship in the entity graph:
      creating a duplicate child entity;
      creating an edge from the parent entity to the duplicate child entity;
      removing every outgoing edge from the child entity other than an edge between the child entity and the parent entity in that relationship; and
      adding every outgoing edge removed from the child entity as an outgoing edge from the duplicate child entity.

3. The method of claim 1, wherein acyclic subset processing comprises:
   for every entity corresponding to a table that is to be subsetted, generating an entity-subset definition which defines a portion of the requested subset of data that is in the table represented by the entity, wherein the entity-subset definition comprises one or more expressions;
   generating a plan space based on the entity-subset definitions, the plan space comprising one or more operators and one or more intermediate expressions required to compute one or more final subset tables corresponding to the requested subset of data;
   expanding the plan space by generating one or more additional operators and one or more additional intermediate expressions that are equivalent to the one or more operators and the one or more intermediate expressions;
   selecting a group of operators in the plan space that can be used to calculate the one or more final subset tables; and
   calculating the one or more final subset tables using the selected group of operators.

4. The method of claim 3, wherein selecting a group of operators comprises:
   assigning costs to each of the operators in the plan space; and
   selecting the group of operators that has the lowest total cost.

5. The method of claim 1, further comprising:
   performing, by at least one of the one or more computing devices, cyclic subset processing using the entity graph based at least in part on a determination that the entity graph contains a cycle; or
   performing, by at least one of the one or more computing devices, cyclic subset processing using the expanded entity graph based at least in part on a determination that the expanded entity graph contains a cycle.

6. The method of claim 5, wherein cyclic subset processing comprises:
   for every entity corresponding to a table that is to be subsetted, generating an entity-subset definition which defines a portion of the requested subset of data that is in the table, wherein the entity-subset definition comprises one or more expressions;
   for every entity corresponding to a table that is to be subsetted, generating a staging table from the table, wherein the staging table comprises only the columns of data required to evaluate the one or more expressions in the entity-subset definition for that entity and a column of flag values representing whether a particular row is to be included in the final subset, wherein each flag value is initially set to true if the data values in that row fulfill the subset criteria and set to false otherwise;

recursively evaluating every expression in each entity-subset definition and changing the flag values to true for each of the rows which satisfy the expression in each of the staging tables; and generating one or more final subset tables by compiling all of the rows from the plurality of tables that correspond to rows in the staging tables which have a flag value of true.

7. An apparatus for data subsetting, the apparatus comprising:
one or more processors; and
one or more memories operatively coupled to at least one of the one or more processors and having instructions stored thereon that, when executed by at least one of the one or more processors, cause at least one of the one or more processors to:
receive a request for a subset of data from a plurality of tables, the request comprising subset criteria;
generate an entity graph corresponding to the plurality of tables, the entity graph comprising:
a plurality of entities, each entity representing a table in the plurality of tables;
edge data corresponding to a plurality of edges between the entities, wherein the edge data identifies a parent entity and a child entity, and each edge runs from a child entity to a parent entity; and
relationship data corresponding to a plurality of relationships between the entities, wherein the relationship data identifies whether the relationship between the parent entity and the child entity is a major relationship or a minor relationship;
expand the entity graph to generate an expanded entity graph based at least in part on a determination that the entity graph does not contain a cycle; and
perform acyclic subset processing on the expanded entity graph based at least in part on a determination that the entity graph does not contain a cycle and a determination that the expanded entity graph does not contain a cycle.

8. The apparatus of claim 7, wherein expanding the entity graph to generate an expanded entity graph comprises:
for every major relationship in the entity graph:
creating a duplicate child entity;
creating an edge from the parent entity to the duplicate child entity;
removing every outgoing edge from the child entity other than an edge between the child entity and the parent entity in that relationship; and
adding every outgoing edge removed from the child entity as an outgoing edge from the duplicate child entity.

9. The apparatus of claim 7, wherein acyclic subset processing comprises:
for every entity corresponding to a table that is to be subsetted, generating an entity-subset definition which defines a portion of the requested subset of data that is in the table represented by the entity, wherein the entity-subset definition comprises one or more expressions;
generating a plan space based on the entity-subset definitions, the plan space comprising one or more operators and one or more intermediate expressions required to compute one or more final subset tables corresponding to the requested subset of data;
expanding the plan space by generating one or more additional operators and one or more additional intermediate expressions that are equivalent to the one or more operators and the one or more intermediate expressions;
selecting a group of operators in the plan space that can be used to calculate the one or more final subset tables; and
calculating the one or more final subset tables using the selected group of operators.

10. The apparatus of claim 9, wherein selecting a group of operators comprises:
assigning costs to each of the operators in the plan space; and
selecting the group of operators that has the lowest total cost.

11. The apparatus of claim 7, wherein at least one of the one or more memories has further instructions stored thereon that, when executed by at least one of the one or more processors, cause at least one of the one or more processors to:
perform cyclic subset processing using the entity graph based at least in part on a determination that the entity graph contains a cycle; or
perform cyclic subset processing using the expanded entity graph based at least in part on a determination that the expanded entity graph contains a cycle.

12. The apparatus of claim 11, wherein cyclic subset processing comprises:
for every entity corresponding to a table that is to be subsetted, generating an entity-subset definition which defines a portion of the requested subset of data that is in the table, wherein the entity-subset definition comprises one or more expressions;
for every entity corresponding to a table that is to be subsetted, generating a staging table from the table, wherein the staging table comprises only the columns of data required to evaluate the one or more expressions in the entity-subset definition for that entity and a column of flag values representing whether a particular row is to be included in the final subset, wherein each flag value is initially set to true if the data values in that row fulfill the subset criteria and set to false otherwise;
recursively evaluating every expression in each entity-subset definition and changing the flag values to true for each of the rows which satisfy the expression in each of the staging tables; and
generating one or more final subset tables by compiling all of the rows from the plurality of tables that correspond to rows in the staging tables which have a flag value of true.

13. At least one non-transitory computer-readable storage medium storing computer-readable instructions that, when executed by one or more computing devices, cause at least one of the one or more computing devices to:
receive a request for a subset of data from a plurality of tables, the request comprising subset criteria;
generate an entity graph corresponding to the plurality of tables, the entity graph comprising:
a plurality of entities, each entity representing a table in the plurality of tables;
edge data corresponding to a plurality of edges between the entities, wherein the edge data identifies a parent entity and a child entity, and each edge runs from a child entity to a parent entity; and relationship data corresponding to a plurality of relationships between the entities, wherein the relationship data identifies whether the relationship between the parent entity and the child entity is a major relationship or a minor relationship;

expand the entity graph to generate an expanded entity graph based at least in part on a determination that the entity graph does not contain a cycle; and perform acyclic subset processing on the expanded entity graph based at least in part on a determination that the entity graph does not contain a cycle and a determination that the expanded entity graph does not contain a cycle.

14. The at least one non-transitory computer-readable storage medium of claim 13, wherein expanding the entity graph to generate an expanded entity graph comprises:

for every major relationship in the entity graph:
creating a duplicate child entity;
creating an edge from the parent entity to the duplicate child entity;
removing every outgoing edge from the child entity other than an edge between the child entity and the parent entity in that relationship; and
adding every outgoing edge removed from the child entity as an outgoing edge from the duplicate child entity.

15. The at least one non-transitory computer-readable storage medium of claim 13, wherein acyclic subset processing comprises:

for every entity corresponding to a table that is to be subsetted, generating an entity-subset definition which defines a portion of the requested subset of data that is in the table represented by the entity, wherein the entity-subset definition comprises one or more expressions;

generating a plan space based on the entity-subset definitions, the plan space comprising one or more operators and one or more intermediate expressions required to compute one or more final subset tables corresponding to the requested subset of data;

expanding the plan space by generating one or more additional operators and one or more additional intermediate expressions that are equivalent to the one or more operators and the one or more intermediate expressions;

selecting a group of operators in the plan space that can be used to calculate the one or more final subset tables; and calculating the one or more final subset tables using the selected group of operators.

16. The at least one non-transitory computer-readable storage medium of claim 15, wherein selecting a group of operators comprises:

assigning costs to each of the operators in the plan space; and selecting the group of operators that has the lowest total cost.

17. The at least one non-transitory computer-readable storage medium of claim 13, further storing computer-readable instructions that, when executed by at least one of the one or more computing devices, cause at least one of the one or more computing devices to:

perform cyclic subset processing using the entity graph based at least in part on a determination that the entity graph contains a cycle; or perform cyclic subset processing using the expanded entity graph based at least in part on a determination that the expanded entity graph contains a cycle.

18. The at least one non-transitory computer-readable medium of claim 17, wherein cyclic subset processing comprises:

for every entity corresponding to a table that is to be subsetted, generating an entity-subset definition which defines a portion of the requested subset of data that is in the table, wherein the entity-subset definition comprises one or more expressions;

for every entity corresponding to a table that is to be subsetted, generating a staging table from the table, wherein the staging table comprises only the columns of data required to evaluate the one or more expressions in the entity-subset definition for that entity and a column of flag values representing whether a particular row is to be included in the final subset, wherein each flag value is initially set to true if the data values in that row fulfill the subset criteria and set to false otherwise;

recursively evaluating every expression in each entity-subset definition and changing the flag values to true for each of the rows which satisfy the expression in each of the staging tables; and generating one or more final subset tables by compiling all of the rows from the plurality of tables that correspond to rows in the staging tables which have a flag value of true.

* * * * *